United States Patent
Zamorano et al.

(10) Patent No.: US 11,247,402 B2
(45) Date of Patent: Feb. 15, 2022

(54) THREE-DIMENSIONAL PRINTING

(71) Applicant: HEWLETT-PACKARD DEVELOPMENT COMPANY, L.P., Houston, TX (US)

(72) Inventors: Juan Manuel Zamorano, Barcelona (ES); David Soriano Fosas, Barcelona (ES); Sergio De Santiago Dominguez, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 575 days.

(21) Appl. No.: 16/089,871

(22) PCT Filed: Dec. 13, 2016

(86) PCT No.: PCT/US2016/066349
§ 371 (c)(1),
(2) Date: Sep. 28, 2018

(87) PCT Pub. No.: WO2018/111239
PCT Pub. Date: Jun. 21, 2018

(65) Prior Publication Data
US 2020/0298497 A1   Sep. 24, 2020

(51) Int. Cl.
*B29C 64/393*   (2017.01)
*B33Y 30/00*   (2015.01)
(Continued)

(52) U.S. Cl.
CPC .......... *B29C 64/393* (2017.08); *B29C 64/255* (2017.08); *B29C 64/314* (2017.08);
(Continued)

(58) Field of Classification Search
CPC .......... B29C 64/255–259; B29C 64/307–314; B29C 64/393; G03G 15/0863; G03G 21/1892; B41J 2/17506; B41J 2/17546
See application file for complete search history.

(56) References Cited

U.S. PATENT DOCUMENTS 6,385,407 B1 * 5/2002 Inose .................. B41J 2/17503
222/DIG. 1
7,296,990 B2   11/2007 Devos et al.
(Continued)

FOREIGN PATENT DOCUMENTS

WO        9805508 A1   2/1998
WO    2004044816 A1   5/2004
(Continued)

OTHER PUBLICATIONS

"Printing with Multiple Extruders", Simplify3D, Retrieved from Internet: https://www.simplify3d.com/support/tutorials/printing-with-multiple-extruders/, 2016, pp. 1-5.

*Primary Examiner* — Marc C Howell
*Assistant Examiner* — John J DeRusso
(74) *Attorney, Agent, or Firm* — Dicke Billig & Czaja PLLC

(57) ABSTRACT

An apparatus and method for performing a print operation on a 3D printer (110) are described herein. A 3D printing apparatus comprising a 3D printer (110) is arranged to perform a print operation using build material from a build unit (120) unless a value that identifies a first build material stored in the build unit in a first register, which is set according to an initial build powder fill operation of the build unit (120) by a powder management station, is different from a value in a second register, which is set according to the initial build powder fill operation, or modified in response to, or following, a subsequent opening of the build unit (120).

10 Claims, 5 Drawing Sheets

(51) Int. Cl.
  *B33Y 50/02* (2015.01)
  *B29C 64/314* (2017.01)
  *B29C 64/255* (2017.01)
  *B33Y 40/10* (2020.01)
  *G05B 19/4099* (2006.01)

(52) U.S. Cl.
  CPC .............. *B33Y 30/00* (2014.12); *B33Y 40/10* (2020.01); *B33Y 50/02* (2014.12); *G05B 19/4099* (2013.01); *G05B 2219/49023* (2013.01)

(56) References Cited

U.S. PATENT DOCUMENTS

| | | | |
|---|---|---|---|
| 9,233,504 B2 | 1/2016 | Douglas et al. | |
| 2005/0127090 A1* | 6/2005 | Sayers | B41J 2/17553 222/1 |
| 2007/0071458 A1* | 3/2007 | Tanaka | B41J 2/17503 222/DIG. 1 |
| 2011/0117268 A1 | 5/2011 | Batchelder et al. | |
| 2015/0197063 A1 | 7/2015 | Shinar et al. | |
| 2016/0349665 A1* | 12/2016 | Takahashi | G03G 15/0863 |

FOREIGN PATENT DOCUMENTS

| | | | | |
|---|---|---|---|---|
| WO | 2015136277 A1 | 9/2015 | | |
| WO | 2015185155 A1 | 12/2015 | | |
| WO | WO-2016116139 A1 * | 7/2016 | ............. | B33Y 50/02 |

* cited by examiner

THREE-DIMENSIONAL PRINTING

BACKGROUND

Additive manufacturing techniques such as three-dimensional (3D) printing, relate to techniques for making 3D objects of almost any shape from a digital 3D model through additive processes, in which 3D objects are generated on a layer-by-layer basis under computer control. A large variety of additive manufacturing technologies have been developed, differing in build materials, deposition techniques and processes by which a 3D object is formed from the build material. Such techniques may range from applying ultraviolet light to photopolymer resin, to melting semi-crystalline thermoplastic materials in powder form, to electron-beam melting of metal powders.

Additive manufacturing processes usually begin with a digital representation of a 3D object to be manufactured. This digital representation is virtually sliced into layers by computer software or may be provided in pre-sliced format. Each layer represents a cross-section of the desired object, and is sent to an additive manufacturing apparatus, that in some instances is known as a 3D printer, where it is built as a new layer or upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may for example comprise powder-like material, paste material, slurry material or liquid material.

Different build materials may have different characteristics. For example, different build materials may have differing fusing temperatures and may be associated with different respective heating parameters. For instance, such parameters may include heating temperature and/or heating time. Using appropriate printing parameters for a given build material ensures safety, optimum build performance and quality.

BRIEF DESCRIPTION OF THE DRAWINGS

Various features of the present disclosure will be apparent from the detailed description which follows, taken in conjunction with the accompanying drawings, which together illustrate, features of the present disclosure, and wherein.

DETAILED DESCRIPTION

Figure 1:
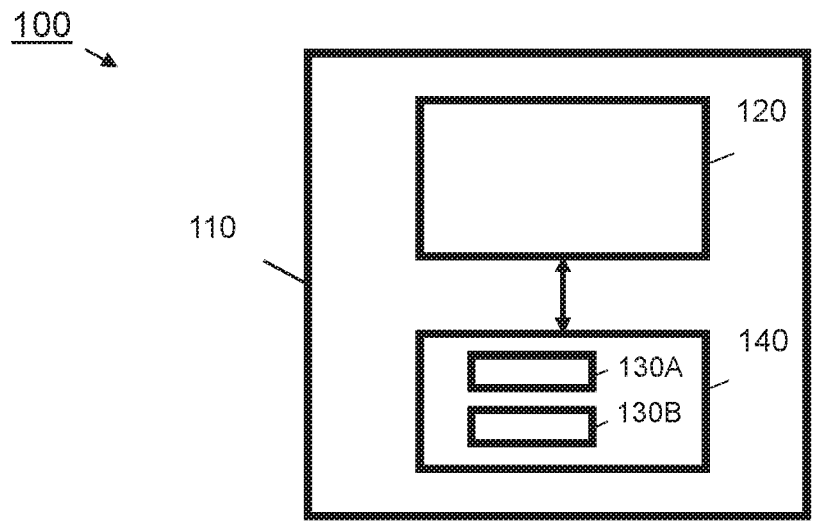
FIG. 1 is a schematic diagram of a 3D printing apparatus according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples Some 3D printing systems build three-dimensional objects using build materials, for instance powder-like materials, which are deposited in layers. Printing agents, such as fusing agents and detailing agents, may be selectively deposited on each layer of the build material and are heated or otherwise treated to solidify the build materials to form the 3D object layer by layer. A 3D printer may have operating parameters that can be varied to control heating and other environmental conditions for various different kinds of build material to ensure safety, performance and build quality. While examples herein relate to 3D printing systems that use powder-like build materials the principles may apply equally to other kinds of build materials, such as paste material, slurry material or liquid material, which may use different conditions for solidification and respective different additive manufacturing operating parameters.

3D printer systems may comprise different units. An example of a 3D printer system comprises a 3D printer and a build unit, which contains build material, such as build powder, and in which a 3D object is built. The build unit may have to be filled or refilled with build powder as the build powder is depleted. For example, the build unit may have to be refilled when it is empty of build powder. Alternatively, the build unit may have to be refilled, for example, if the amount of build powder left in the build unit is determined to be insufficient to complete a print operation. According to an example, the build unit may be filled at a build powder management station, which is separate from the 3D printer and part of the 3D printer system. The build powder management station may contain build powder or draw build powder from one or more build powder containers, which store individual build powders. The build unit may be removably installable in the 3D printer so that it can be decoupled and moved to the build powder management station to carry out a build powder fill or refill operation before being returned to the 3D printer.

Build powders suitable for use in 3D printer systems herein may include at least one of polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, short-fibre powders, colored powders, metal powder, ceramics powder such as for example, glass particles, and/or a combination of at least two of these or other materials, wherein such combination may include different particles each of different materials, or different materials in a single compound particle. Examples of blended build materials include alumide, which may include a blend of aluminum and polyamide, multi-color powder, and plastics/ceramics blends. Blended build material may comprise two or more different respective average particle sizes.

Not all build powder that is supplied for a particular build may be solidified to form 3D objects. Such unfused build powder may be recovered and recycled by a build powder management station, for instance, and mixed with virgin (or new) build powder. In this way, build powder that is supplied by a build powder management station to a build unit may be a mixture of recycled and virgin build powders.

The aforementioned build powders and mixes of build powders may solidify under a wide range of different conditions and respective different 3D printer operating parameters. To ensure correct, efficient and safe operation of a 3D printer, the respective operating parameters are set appropriately for each build operation.

Certain examples described herein reduce the risks associated with using incorrect 3D printer operating parameters with build material, such as build powder. In a 3D printer system in which the build unit is separable from the 3D printer, a typical refilling operation may involve an operator removing the build unit from the 3D printer and connecting it to the build powder management station to fill the build unit with a new build material or refill the build unit with the more of the same build material. The build unit may then be returned to the 3D printer. Once the build unit is filled or replenished, the 3D printer can execute further 3D print operations.

A potentially hazardous situation can arise, if an operator of the 3D printing system accesses the build unit after the build unit has been (re)filled at the powder management station and subsequently fills the build unit with a different kind of build powder. In these circumstances, the 3D printer may print using operating parameters which are suitable for the original build powder and not the build powder placed in the build unit by the operator.

Some example systems and methods disclosed herein can reduce the likelihood of operating a 3D printer with operating parameters that are not suitable for a build material, such as a build powder, that is in a build unit. In particular, examples described herein address the aforementioned risks associated to an operator placing a build powder in the build unit themselves. In examples herein an arrangement of registers is deployed to encode data that may be used to represent the build material present in the build unit.

According to an example, a register unit is provided on the build unit comprising a first register and a second register. The register unit may be readable by a respective 3D printer. The registers can be hardware-based registers comprising circuitry and/or one or more mechanical or electro-mechanical components. Alternatively, in another example, the registers are implemented in software.

A build powder management station, which is arranged to fill or refill a build unit, may also be arranged to read and/or set the registers. According to an example, when the build unit is filled at the build powder management station, the build powder management station is arranged to set values in the first and second registers, where the values represent the build powder type that is being added to the build unit. After a build powder fill operation, the 3D printer may execute a print operation. Moreover, if it is determined that the powder supply in the build unit is insufficient to complete the print operation, the print operation may be paused and an operator may then carry out another build powder fill operation of the build unit. According to an example, the second register is modified when the build unit is opened. The second register may be modified irrespective of whether the operator actually adds build material, for instance, as a result of the operator opening a refill cap.

In one arrangement the 3D printer is arranged to perform a print operation using the build unit unless the values in the first register and the second register of the build unit do not match each other. In an example, if the registers match, the 3D printer is arranged to perform a print operation using printing parameters that are determined according to the value in the registers.

According to an example, the register unit may comprise or be connected to a reader device, such as a key reader, to receive and/or read a key and set a value in the second register as determined by information encoded into the key. The key may be provided along with a container of build powder and have encoded thereon information to determine certain 3D printing parameters that are appropriate for the build powder that is contained in the respective build container. The key, for example, may be inserted into the key reader by the operator of the 3D printing system after a fill operation in which a build unit is filled with the respective build powder.

Certain examples of systems and methods described herein provide a mechanical means for controlling operating parameters of the 3D printer. In one example, the key and key reader system may be implemented using relatively simple mechanical keys that are adapted to co-operate with a mechanical key reader to actuate the registers. In one example, safety systems within the 3D printer, such as a temperature control system, can be coupled to the registers and arranged not to operate in the absence of appropriate values stored in the registers. Operating parameters of the system, such as heating temperature and/or heating duration of the 3D printer, may also be selected or controlled by reference to the registers. For example, by hardwiring the components of the 3D printer, which control the print operations of the 3D printer, so that operating parameters are dependent on the basis of values stored in the registers, the printing system can ensure that the correct operating parameters for a particular build material are being used in a print operation.

FIG. 1 shows a simplified schematic diagram of a 3D printing apparatus 100 according to an example. In the example shown in FIG. 1 a 3D printer 110 is shown coupled to a build unit 120. The build unit 120 is detachably coupled to the 3D printer 110. The build unit 120 stores a supply of build material, for example, build powder.

According to an example, the 3D print operation comprises depositing a layer of build powder from the build unit 120 onto a build platform of the build unit 120, selectively depositing a fusing agent and optionally a detailing agent onto the layer of powder and applying energy such as heat to fuse the powder. The heat may be provided by one or more heating elements to fuse the portions of the build material where the fusing agent has been applied.

According to the example in FIG. 1, the build unit 120 is detachable from the 3D printer 110. In particular, the build unit 120 may be removed by an operator to perform a refill operation of the build unit 120. In one example a clean-up stage of the build unit occurs prior to a build powder fill operation. For example, in one case a clean-up stage comprises a powder management station removing unused powder from the build unit and recombining the unused powder with fresh powder for a further print operation. Following a build powder fill operation the operator may return the build unit 120 to the 3D printer 110 to perform further print operations.

FIG. 1 shows a register unit 140 comprising two registers 130A and 130B. According to an example, the register unit 140 may be coupled to the build unit 120 such that the registers 130A and 130B in the register unit 140 can be read by the 3D printer when performing a print operation.

In the example shown in FIG. 1 the registers 130A and 130B store values. The values may be numerical values stored in circuitry within the registers or values determined by a mechanical configuration of the registers. The values stored in the registers 130A, 130B may initially be set during a build powder fill operation. For example, the 3D printer 110 may be arranged to perform a print operation using build material from the build unit 120 unless a value stored in the first register 130A, which is set according to an initial build powder fill operation of the build unit 120, is different from a value stored in the second register 130B, which is set according to an initial build powder fill operation, or modified in response to, or following, a subsequent opening of the build unit 120.

Figure 2:
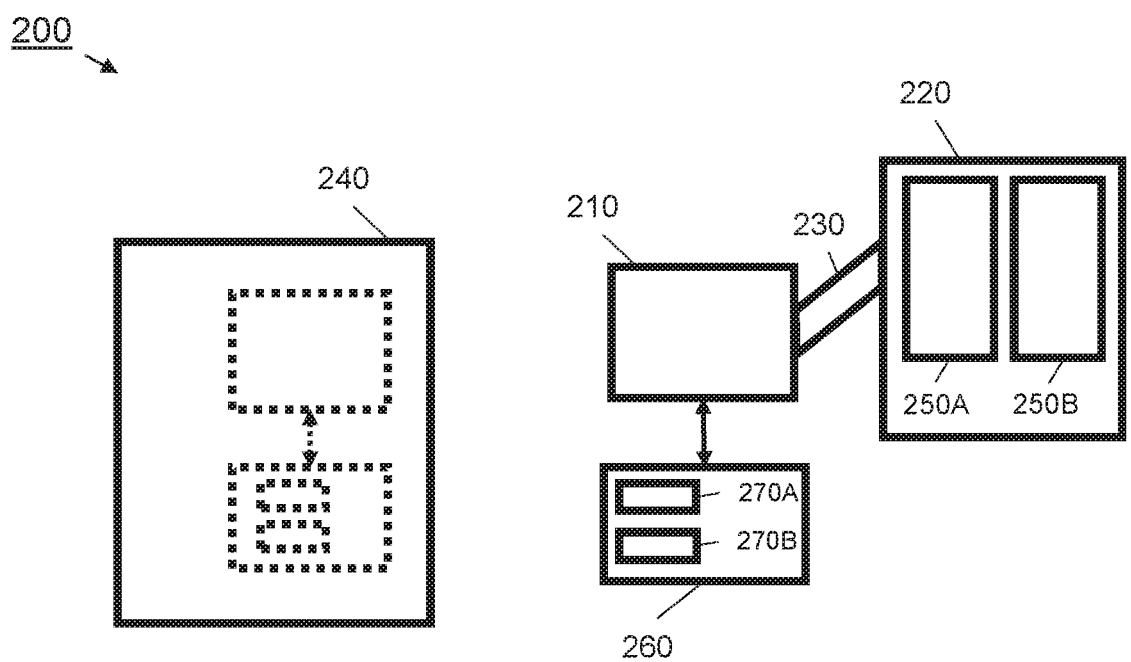
FIG. 2 is a schematic diagram of an apparatus for refilling a build unit of a 3D printing apparatus according to an example.

FIG. 2 is a simplified schematic diagram showing an apparatus 200 for refilling a build unit 210 according to an example. The apparatus 200 comprises a build unit 210 and a build powder management station 220, which may be connectable to one another via a connector 230 for refilling purposes. In this example the build unit 210 is detachable from a respective 3D printer 240 so that it can be moved and coupled to the build powder management station 220. In FIG. 2 the build powder management station 220 is shown containing two build material supplies 250A and 250B corresponding to one or more supplies of build powder. The build powder management station 220 is arranged to supply build material to the build unit 210, from either of the build material supplies 250A, 250B, during a build powder fill operation via the connector 230. According to an example, an operator can control the build powder management station 220, for example, via a user interface, to refill the build unit 210. Following a build powder fill operation the operator can return the build unit 210 to the 3D printer 240 such that the build unit 210 and 3D printer 240 may execute further print operations.

Similar to the build unit 120 shown in FIG. 1, the build unit 210 shown in FIG. 2 is associated with a register unit 260 comprising two registers 270A, 270B. In one example the register unit 260 is coupled to the build unit 210. The registers 270A, 270B are arranged to store values associated with a build material. According to an example, the registers 270A, 270B are set by the powder management station 220 which is arranged to set the registers following an initial build powder fill operation The second register 270B may be set in two ways. Firstly, as explained above when the build unit 210 is first filled with build material at the build powder management station 220, the build powder management station 220 sets values in the registers 270A and 270B. In a second case, the second register 270B is modified in response to, or following, a subsequent opening of the build unit 210. Herein modifying the value in the second register 270B comprises clearing or over-writing any value stored in the second register 270B, for example by setting the value of the register to a predetermined value such as zero. Furthermore, modifying the value in the second register 270B following a subsequent opening of the build unit 210 may comprise re-setting a value in the second register 270B using, for example, a key or key-based mechanism as previously described.

Figure 3A:
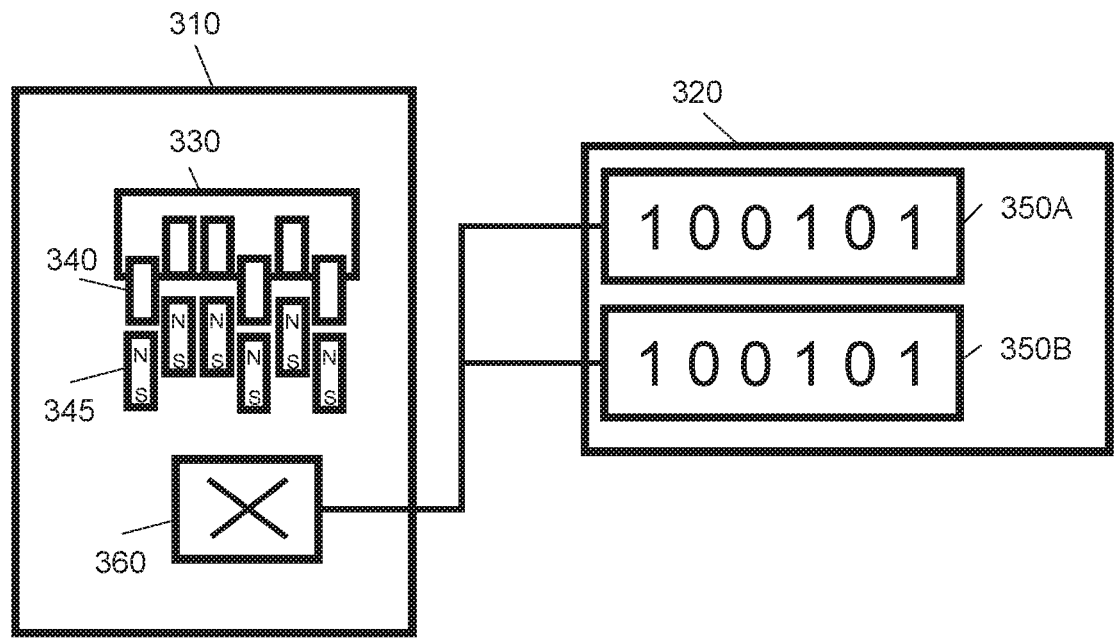
FIG. 3A is a schematic diagram of a key reader and register apparatus according to an example.

FIG. 3A shows an example of an apparatus for setting the second register using a key based mechanism which may be used with the methods and systems described herein. In FIG. 3A an arrangement comprising a key reader 310 and a register unit 320 is shown. For example, a key reader such as key reader 310 may be coupled to the register unit 140, 260 shown in FIG. 1 or FIG. 2 respectively. In the present instance, a key 330 shown in FIG. 3A is a key with physical "teeth" 340 and the key reader 310 is arranged to receive such a key. In general, however, the key reader 310 may be a mechanical or electro-mechanical device which is arranged to receive a key or, alternatively in other examples, the key could be for example, a key card such as a smart card, and the key reader could be a smart card reader.

Each kind of build material that may be used in the build unit 210 may have a specific, corresponding set of 3D printer operating parameters associated with it. A key may be used to provide a code from which the operating parameters may be determined. The key may be supplied with a container in which the respective build material is supplied. With a mechanical key, the code may be represented by a particular arrangement of teeth 340, which are distinctive for each different kind of build material. Other kinds of key may be used to represent the code in other appropriate ways.

In FIG. 3A a key reader 310 is arranged to receive the key 330. In one implementation, an impression or signature made by the key 330 on key reader 310 is recorded using, for example, one or more moveable magnets 345 inside the key reader 310, which are actuated by the key. In FIG. 3A the register unit 320 comprises two registers 350A, 350B which record values representative of the keys which have been inserted into the key reader 310. The values stored in the registers 350A and 350B may be recorded using a magnetic sensor such as a Hall sensor 360, which detects a change in a magnetic field caused by the movement of the moveable magnets 345 using an electric circuit.

The registers 350A, 350B in FIG. 3A are shown coupled to the Hall sensor 360. In the example shown in FIG. 3A the first and second registers 350A, 350B record the signature of the key 330 as indicated by the binary digits in the registers 350A, 350B. In one case, the values in the registers 350A, 350B are both cleared, for example set to zero, following a "hard reset" of the registers. In one implementation a control may be provided, on the build unit and/or register unit, which may be arranged so that it clears both registers when operated. The control may comprise without limitation, for instance, a switch, a button, a lever, an option on a user interface such as a touch-screen or equivalent. For example, an operator may actuate a control comprising a switch when they wish to print with a different kind of powder. Then, for example, after an appropriate cleaning operation, an operator can refill the build unit with the different kind of powder at the build powder management station. The powder management station then sets both registers 350A, 350B to the same value.

Figure 3B:
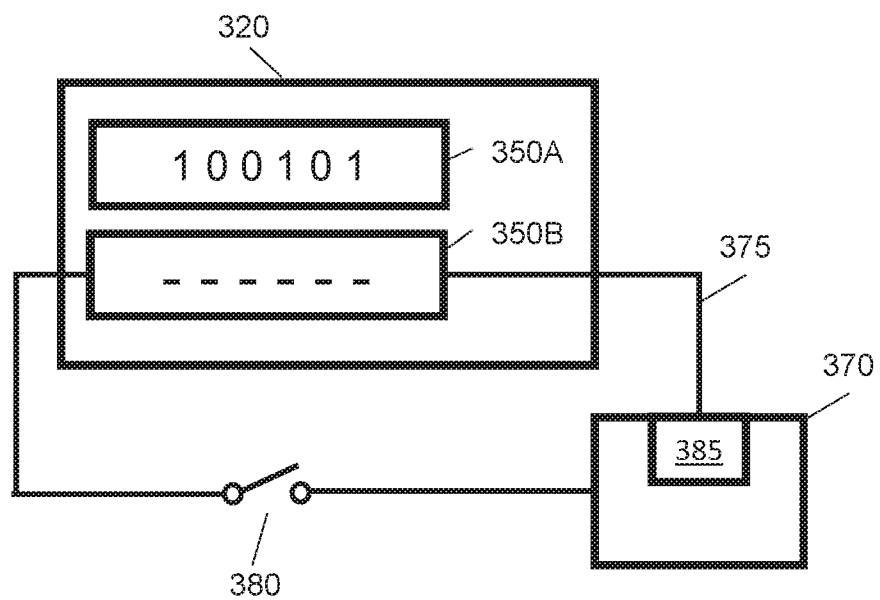
FIG. 3B is a schematic diagram of a register according to an example.

An example in FIG. 3B shows the same register unit 320 and registers 350A and 350B. However, in FIG. 3B, register 350A stores a value and register 350B is set to zero. In this arrangement, the register unit 320 is shown connected to a build unit 370 of a 3D printer via, for example, an electrical circuit 375. The register 350B is arranged using a suitable detector and circuit arrangement 380 such that when the build unit 370 is opened (for example, a build material refill cap is opened) the value is erased from the register 350B. An electrical sensor or switch may be used to detect the opening of the build unit or refilling cap of the build unit.

In an example, the operator can insert a key into the key reader 310 in order to set the value of the second register 350B. If there has been no "hard reset", the value of the first register 350A reflects the value from the previous fill operation. The values stored in the registers 350A and 350B may be compared by a 3D printer to determine whether it is deemed safe to perform a print operation. In an example, a 3D printer may not perform a requested print operation if the values do not match, as will be described herein.

Figure 4:
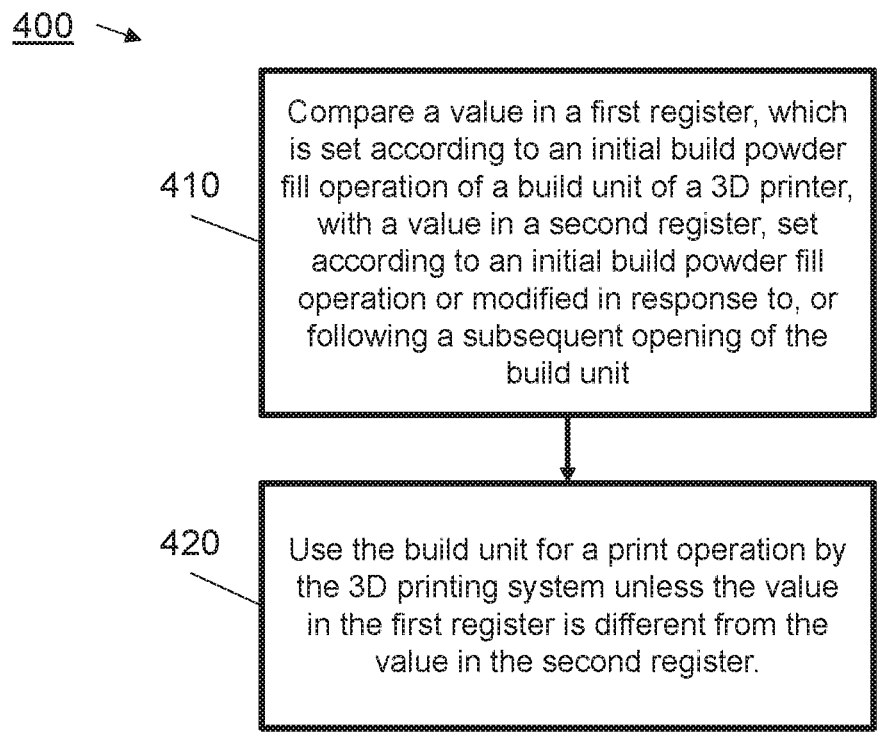
FIG. 4 is a flow diagram illustrating a method of performing a print operation according to an example.

FIG. 4 illustrates a method 400 of performing a print operation according to an example. The method 400 may be implemented on the apparatus 100 and 200 shown in FIGS. 1 and 2. At block 410 a value in a first register set according to an initial build powder fill operation of a build unit is compared with a value in a second register. According to an example, the value is the second register is set according to the initial build powder fill operation, or modified in response to, or following, a subsequent opening of the build unit. At block 420 the build unit is used to perform print operation unless the value in the first register is different from the value in the second register.

When the method 400 is implemented on the apparatus 200 shown in FIG. 2, the first register 270A may contain a first value from a first build powder fill operation. According to an example, a build powder fill operation comprises at least the decoupling of the build unit 210 from the 3D printer 240 to enable refilling thereof with a build material. In the example shown in FIG. 2, where the build unit 210 is attached to the 3D printer 240 via a coupling, an operator decouples the build unit 210 from the 3D printer 240 to perform a build powder fill operation, and couples the build unit 210 to the build powder management station 220. Subsequently, the registers 270A and 270B store a value associated to the build material deposited in the build unit 210. The operator couples the build unit 210 to the 3D printer 240 following the build powder fill operation. In one case, the 3D printer 240 receives an instruction to execute a print operation and implements block 410 shown in FIG. 4 by comparing the values in the registers 270A, 270B. If this was the first print operation following a hard reset of the registers, then the registers 270A, 270B contain the same value, since the two registers would have been set following a build powder fill operation, and the 3D printer executes the print operation. At some point, the build powder supply in the build unit 210 needs replenishing. The operator of the 3D printer 240 may be notified, for example, via a warning light on the 3D printer 240. The operator decouples the build unit 210 from the 3D printer 240 and couples the build unit 210 to the build powder management station 220. The second register value 270B is modified in response to the build unit 210 being opened. According to an example, the modification comprises clearing a value in the second register 270B in response to the opening of the build unit. In one example, the operator then performs the refill operation at the build powder management station 220, using the build powder supplies in the build powder management station 220 and the value in the second register is set by the powder management station 220. The operator returns the build unit 210 to the 3D printer. When the operator instructs the 3D printer 240 to resume, or execute another print operation, the 3D printer 240 performs a comparison of the values in the registers to determine if the values are the same. In the case of resuming a previous print operation, the values in the registers may be different and the 3D printer 240 may then be arranged to abort the print operation. This may occur if, for example, the operator has opened the build unit subsequent to the build powder fill operation, thereby clearing a value in the second register, and the second register has not then been re-set. This could be due to an attempt by the operator to add their own powder to the build unit 210.

According to examples described herein, optionally, if the values in the two registers 270A, 270B match, one or more operating parameters of the 3D printer 240 may be set according to the value in the registers 270A, 270B. In particular, the first and second register value may be used to determine operating parameters of the 3D printer, such as heating temperature and/or heating time, and/or other parameters relating to fusing and/or detailing agents, such as agent type, amount to use, whether to apply detailing agent, and the like. For example, the registers 270A, 270B can be coupled to circuitry of the 3D printer controlling operating parameters of the 3D printer. Consequently, when the 3D printer sets the operating parameters, for example at a print controller, the values in the registers 270A, 270B determine the values the operating parameters are set to.

Figure 5:
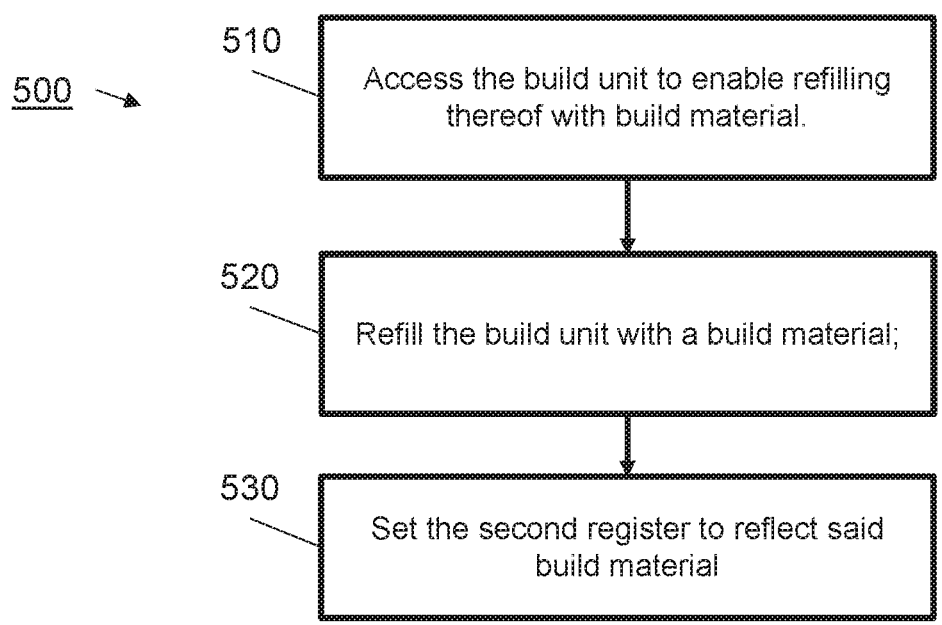
FIG. 5 is a flow diagram illustrating a method of performing a build unit fill operation according to an example.

FIG. 5 illustrates a method 500 of executing a build powder fill operation according to an example. The method 500 may be used in conjunction with the other systems and methods described herein. In particular, the method 500 may be executed on the apparatus 200 to refill the build unit 210. At block 510 the build unit is accessed to enable refilling with build material. In, some examples, in relation to the build unit 210 and 3D printing system 240 the build unit 210 may be accessed by the build powder management station 220 following a decoupling from the 3D printer 240. As described in relation to FIG. 3B, the value in the second register 270B may be arranged to be cleared automatically when a refill cap of the build unit is opened. This ensures that the operator cannot return the build unit 210 to the 3D printer 240 and cause the 3D printer 240 to execute a print operation without having performed steps to ensure that a new value has been stored in the second register 270B, including by introducing the key 330 in the key reader 310.

At block 520 the build unit is refilled with a build powder. In an example, the refilling operation is carried out at a build powder management station such as build powder management station 220 shown in FIG. 2. In an alternative example a refill operation comprises manually opening a build unit and refilling the build unit with build powder. In such circumstances, however, the second register would have to be manually set, as described, before a build operation could be started or resumed. In both examples, the build unit is opened and the second register is modified, thus preventing a print operation from being executed by the 3D printer unless the value in the second register has been set to match the first register. At block 530, the second register is set to reflect the build powder, for example, according to the key reader and key mechanism described in FIGS. 3A, 3B.

Following the setting of the value of the second register, the build unit is in a state ready to execute a 3D print operation with the 3D printer.

Figure 6:
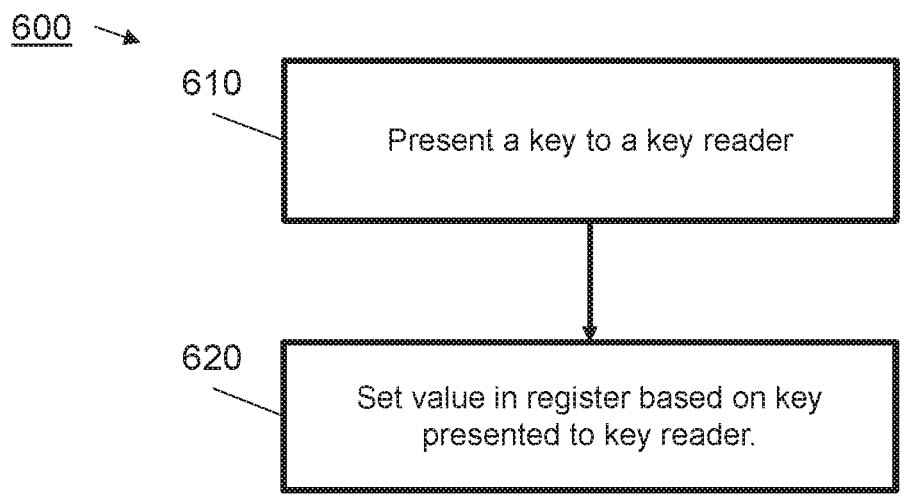
FIG. 6 is a flow diagram illustrating a method of setting a value in a register according to an example.

FIG. 6 illustrates a method 600 of a setting a value of a register according to an example. The method 600 may be implemented with the key reader and keys shown in FIGS. 3A and 3B in conjunction with the apparatus shown in FIG. 2. At block 610 a key is presented to a key reader. According to an example, an operator presents a key to the key reader associated with build materials stored in the build powder management station 220 subsequent to an opening of the build unit 210. The operator may present the key which corresponds to the build powder placed in the build unit 210. For example, in the case of the physical key 330 and key reader 310 shown in FIG. 3A, the operator may insert the key 330 into the key reader 310. At block 620 a value is set in a register based on the key which was presented to the key reader. In one example a circuit is responsive to the key and the value in the registers is set by detecting a change in voltage and recording the change in the registers.

The methods and systems described herein provide a means for an operator of a 3D printing system to refill a build unit of the 3D printing system. In particular, the present systems and methods can be used to refill the build unit with a degree of confidence that the 3D printing system will not execute a print operation using incorrect operating parameters. In examples, the methods and systems uses a check between two registers to prevent a print operation from happening in the event the register values do not match, indicating that an operator of the 3D printing system may have attempted to access the build unit and place their own powder in the build unit. Furthermore, certain examples of the present disclosure can be implemented in a hardware only setting in which the operating parameters of the 3D printer which control, for example, the heating elements of the 3D printer, are directly determined from the values stored in the registers. This may avoid operator and/or other forms of error.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

The invention claimed is:

1. A method comprising:
    comparing a value in a first register, which is set according to an initial build powder fill operation of a build unit of a 3D printing system, with a value in a second register, which is set according to an initial build powder fill operation, wherein the values of the respective first and second registers represent a build material;
    modifying the value of the second register in response to, or following, a subsequent opening of the build unit; and
    using the build unit for a print operation by the 3D printing system unless the value in the first register is different from the value in the second register.

2. The method according to claim 1 comprising comparing the values stored in the first and second registers in response to receiving an instruction to perform a print operation using the 3D printing system.

3. The method of claim 1, comprising:
    clearing the value in the second register, as part of a build powder fill operation, to be different from the value of the first register, the build powder fill operation comprising at least decoupling the build unit from the 3D printing system to enable refilling thereof with build material.

4. The method of claim 3, comprising: implementing the build powder fill operation as comprising:
    refilling the build unit with a build material; and
    re-setting the value of the second register to match the value of the first register and to represent the build material.

5. The method of claim 4, comprising:
    performing the re-setting of the value of the second register in response to a key associated with the build material being presented to a key reader of the 3D printing system.

6. The method of claim 1, wherein performing the print operation comprises selecting one or more operating parameters of the 3D printing system according to the values of the first and second registers.

7. The method of claim 6 wherein the one or more operating parameters relate to a heating temperature of a build material to be used in the print operation.

8. A method comprising:
    comparing a value in a first register, which is set according to an initial build powder fill operation of a build unit of a 3D printing system, with a value in a second register, which is set according to an initial build powder fill operation;
    clearing the value of the second register in response to, or following at least one of:
        a decoupling of the build unit from the 3D printing system; and
        a subsequent opening of the build unit;
    resetting the value of the second register to match the value of the first register in response to a key reader of the 3D printing system receiving a key associated with a refilling of a build material in the build unit; and
    using the build unit for a print operation by the 3D printing system unless the value in the first register is different from the value in the second register.

9. The method of clam 8, comprising:
    implementing the comparing of the values stored in the respective first and second registers in response to receiving an instruction to perform a print operation of the 3D printing system and/or a coupling of the build unit to the 3D printing system.

10. The method of claim 8, comprising:
    implementing the resetting the value of the second register to match the first register to represent a build material subsequent to a refill of the build unit with the build material.

* * * * *